(12) United States Patent
Klingman

(10) Patent No.: US 6,976,069 B1
(45) Date of Patent: Dec. 13, 2005

(54) MULTI-SITE NETWORK MONITOR FOR MEASURING PERFORMANCE OVER AN INTERNET

(76) Inventor: Edwin E. Klingman, 3000 Hwy. 84, San Gregorio, CA (US) 94074

( * ) Notice: Subject to any disclaimer, the term of this patent is extended or adjusted under 35 U.S.C. 154(b) by 0 days.

(21) Appl. No.: 09/488,977

(22) Filed: Jan. 21, 2000

Related U.S. Application Data

(60) Provisional application No. 60/131,737, filed on Apr. 30, 1999.

(51) Int. Cl.[7] .............................................. G06F 15/173
(52) U.S. Cl. ........................ 709/224; 370/248; 379/106
(58) Field of Search ................................ 709/223, 224, 709/203, 235, 204, 231; 370/426, 352, 335, 241, 386; 358/442; 375/347, 343, 222, 356, 259; 455/503, 12.1; 379/22.02

(56) References Cited

U.S. PATENT DOCUMENTS

| | | | | | |
|---|---|---|---|---|---|
| 4,539,676 | A | * | 9/1985 | Lucas ........................... | 370/354 |
| 5,734,967 | A | * | 3/1998 | Kotzin et al. ............... | 455/63.1 |
| 6,031,897 | A | * | 2/2000 | Bremer et al. ........... | 379/106.08 |
| 6,148,068 | A | * | 11/2000 | Lowery et al. ........... | 379/202.01 |
| 6,154,500 | A | * | 11/2000 | Dorenbosch et al. ....... | 375/259 |
| 6,272,190 | B1 | * | 8/2001 | Campana, Jr. ............... | 375/347 |
| 6,348,875 | B1 | * | 2/2002 | Odinak et al. .......... | 340/825.52 |
| 6,373,838 | B1 | * | 4/2002 | Law et al. ................... | 370/352 |
| 6,426,942 | B1 | * | 7/2002 | Sienel et al. ................ | 370/235 |
| 6,437,880 | B1 | * | 8/2002 | Oak ........................... | 358/400 |
| 6,466,932 | B1 | * | 10/2002 | Dennis et al. .................. | 707/3 |
| 6,590,869 | B1 | * | 7/2003 | Beyda et al. ................ | 370/248 |
| 6,633,555 | B1 | * | 10/2003 | Lin et al. ..................... | 370/331 |
| 6,690,289 | B1 | * | 2/2004 | Odinak et al. .......... | 340/825.52 |

OTHER PUBLICATIONS

A distributed multimedia conferencing system for distance learning Dugki Min et al, Apr. 20–21, 1998.*
Slelected ATM/emerging Satellite communicatinos technology interface issues; www.ncs.gov/n2/content/tibs/files/tib98_4.pd.*
IP Telphony Performance ; engr.smu.edu//ee/8392/its_perform.pdf.*
Section A—Public Switched Telephone Network and Integrated Services Digital Network Configurations; www.i-fla.org/documents/infopol/canada/tsacc1a.pdf.*
Lucent Softswitch—VoIP Transit Solution; www.lucent.com/livelink/090094038000d04c_Brochure_datasheet.pdf.*
Voice over IP (VoIP); www.liberatedknowledge.com/White.Papers/Techguides/Voice.over.IP.*

* cited by examiner

Primary Examiner—Thong Vu
(74) Attorney, Agent, or Firm—Anthony B. Diepenbrock, III; Dechert LLP

(57) ABSTRACT

An apparatus and method of measuring the performance of a computer network by determining transit times of packets between two selected sites connected by the computer network and the public switched telephone network and deriving from those transit times a measure of the performance of the computer network. Software establishes a network connection and a circuit switched connection between the two selected sites. A pair of messages is sent, at the same or nearly the same time, over the network connection and the circuit-switched connection and the transit time for a one way trip over the network connection is derived from the trips over the network and circuit-switched connections. This furnishes a measurement from which performance statistics of the computer network can be derived.

55 Claims, 5 Drawing Sheets

MULTI-SITE NETWORK MONITOR FOR MEASURING PERFORMANCE OVER AN INTERNET

CROSS-REFERENCE TO RELATED APPLICATIONS

Figure 1:
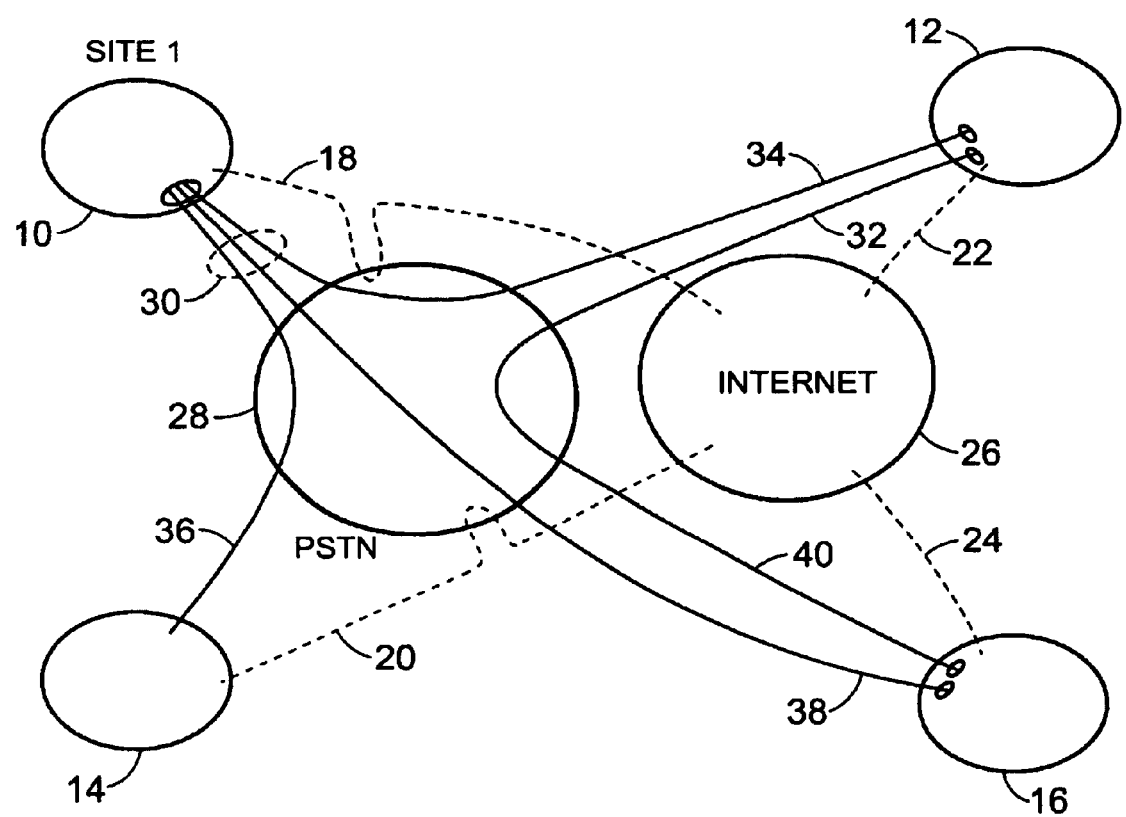
Figure 2A:
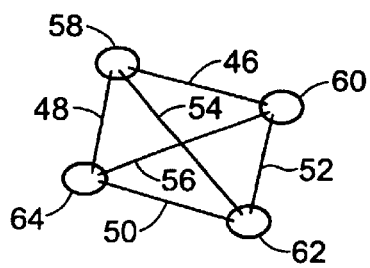
Figure 2B:
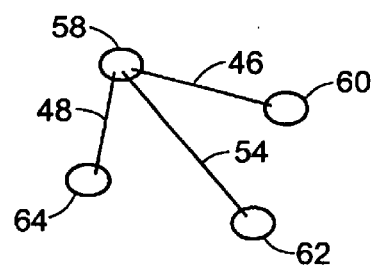
Figure 3A:
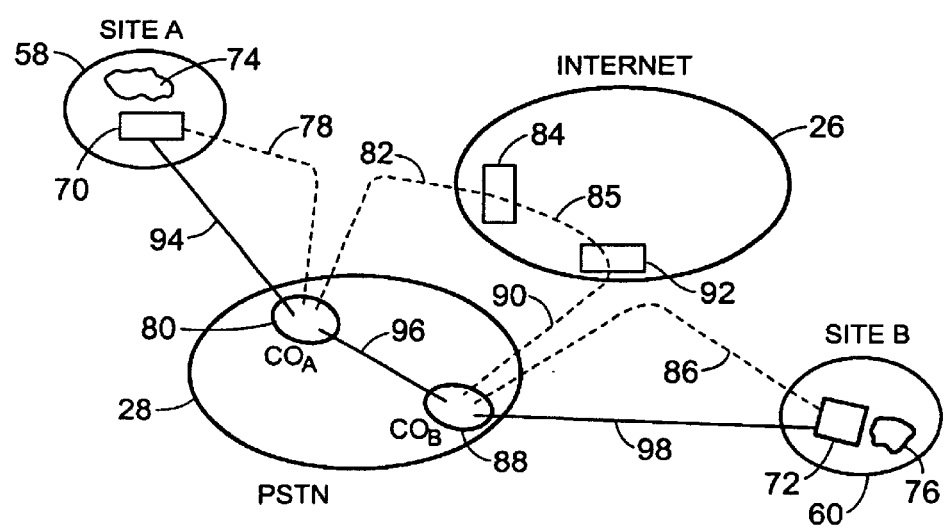
Figure 3B:
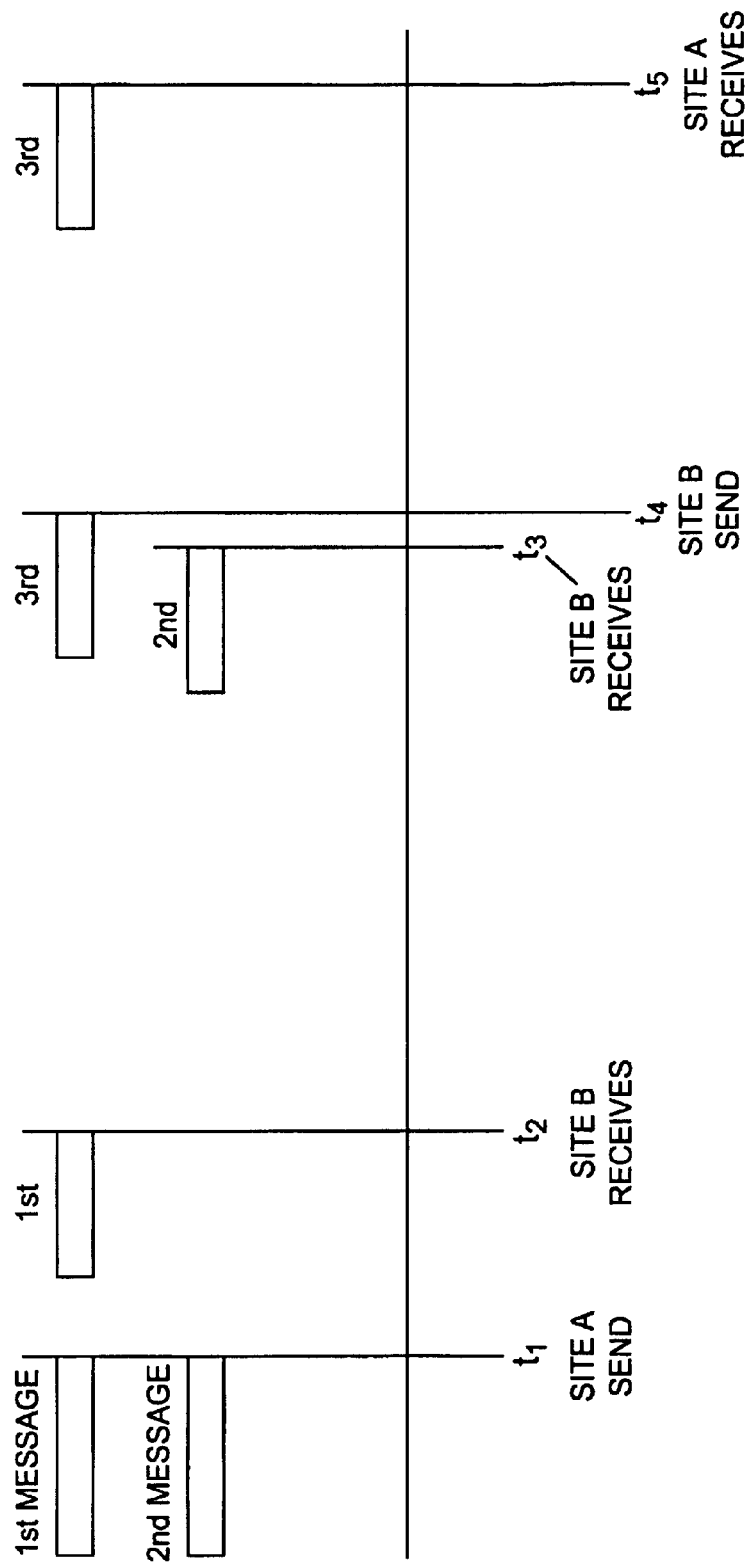

This application claims priority to U.S. Provisional Application entitled "A Multi-Site Network Monitor For Measuring Performance Over An Internet", filed on Apr. 30, 1999, Ser. No. 60/131,737.

BRIED DESCRIPTION OF INVENTION

1. Field of the Invention

The present invention relates generally to field of performance monitoring and measurement and specifically to performance measurement of a computer network.

2. Description of the Related Art

Currently Internet Service Providers (ISPs) are encouraging customers to put mission-critical data on sites connected to the Internet. However, these providers are not supplying tools to the users to monitor performance parameters relating to the quality of service in retrieving that data over the Internet. Monitoring performance on the Internet helps to ensure that the Internet service providers live up their agreements to regarding the quality of service.

One reason that performance monitoring tools are not being provided is that some ISPs believe that such tools would be a security risk to the network because the tools would need to use secure network management protocols to carry out the monitoring task.

What is needed is a system for monitoring network performance that does not create a security risk on the network, yet still provides a way of determining whether ISPs are living up to a promised level of service.

BRIEF SUMMARY OF THE INVENTION

A method in accordance with an embodiment of the present invention is a method of measuring the performance of a computer network. The method includes establishing a public switched telephone network (PSTN) connection between a first computer system and a second computer system and establishing a network connection between the first computer system and a second computer system, where the network connection includes the computer network. The method further includes transmitting a first digital message from the first computer system to the second computer system over the PSTN connection, at the same or nearly the same time as transmitting the first digital message, transmitting a second digital message from the first computer system to the second computer system over the network connection, and receiving a third digital message from the second site over one of the network connection and PSTN connection, in response to the second digital message, where the third digital message contains timing information regarding the receipt of the first and second digital messages at the second computer system. From the third message a one-way transit time between the first and second computer systems as an indication of the performance of the computer network is derived.

A method in accordance with another embodiment of the present invention includes establishing a public switched telephone network (PSTN) connection between the first and second computer systems, and establishing a network connection between a first and second computer systems, where the network connection includes the computer network. The method further includes a transmitting a first packet of information from the first computer system to the second computer system over the PSTN connection, transmitting a second packet of information, at the same or nearly the same time as transmitting the first packet, from the first computer to the second computer system over the network connection, and receiving a third packet of information over one of the computer network and the PSTN from the second computer system, in response to the second system receiving the second packet of information, where the third packet contains timing information regarding the receipt of the first and second packets at the second computer system; and. From the third packet a one-way transit time between the first and second computer systems as an indication of the performance of the computer network is derived.

A method in accordance with yet another embodiment of the present invention includes establishing a network and a PSTN connection between a main computer system and one or more other computer systems connected to the network and the PSTN and transmitting a pair of messages at the same or nearly the same time to each of the other computer systems, where one of the pair travels over the PSTN and the other of the pair travels over the computer network. The method further includes receiving responses form each of the other computer systems to the transmitted messages, where each of the responses contains timing information regarding the receipt of the pair of messages at each of the other computer systems, and determining a one way transit time as an indication of the performance of the computer network from the responses.

A method in accordance with yet another embodiment of the present invention includes establishing a network connection between a first computer system and a second computer system, where each system is connected to the computer network and establishing a high-speed connection between the first and second computer systems, where the high-speed connection is separate from the network connection. The method further includes transmitting a pair of messages at the same or nearly the same time from the first to the second computer system, one of the pair traveling over the high-speed connection and the other of the pair traveling over the network connection, receiving a response message from the second computer system to the message sent over the network connection, where the response contains timing information regarding the receipt of the pair of messagese at the second computer system, and determining a one way transit time as an indication of the performance of the computer network from the response.

A system in accordance with an embodiment of the present invention includes a system for measuring performance of a computer network. The system includes a first program operating on a first computer system connected through the computer network to a second computer system and connected through the public switched telephone network (PSTN) to the second computer system and a second program operating on the second computer system. The first program is operative to transmit, at the same or nearly the same time, a first digital message over the PSTN to the second computer system, and a second digital message over the computer network to the second computer system. The second program is operative to send a third digital message over one of the computer network and the PSTn to the first computer system in response to the second digital message, where the third message contains timing information regarding the receipt of the first and second packets at the second computer system. The first program operates to derive from the third packet a one-way transit time between the first and second computer systems as an indication of the performance of the computer network.

A system in accordance with another embodiment of the present invention includes a first program operating on a first computer system connected through the computer network to a second and a third computer system and connected through the public switched telephone network (PSTN) to the second computer and third computer systems and a second program operating on the second and third computer systems. The first program is operative to transmit, at the same or nearly the same time, a first digital message over the PSTN and a second digital message over the computer network to the second computer system, and operative to transmit, at the same or nearly the same time, a third digital message over the PSTN and a fourth digital message over the computer network to the third computer system. The second program is operative to transmit fifth and sixth digital messages over one of the computer network and the PSTN to the first computer system in response to the second and fourth digital messages, respectively, where the fifth message contains timing information regarding the receipt of the first and second messages at the second computer system and the sixth message contains information regarding the receipt of the third and fourth messages at the third computer system. The first program operates to derive from the fifth message a one-way transit time between the first and second computer systems as and sixth message a one-way transit time between the first and third computer systems as an indication of the performance of the computer network.

Site A determines the approximate transit time of the second message by obtaining the difference in time between t3 and t2. The actual transit time of the second message is the difference between t3 and t1. As mentioned above, because t2-t1 is small, t3-t2 is a good approximation to the actual transit time.

Site A obtains the difference in time between t3 and t2 by either receiving that difference as computed by Site B and transmitted by Site B in the third message or by receiving both the t2 and t3 times as separate times in the third message from Site B. In the first case, Site A obtains the difference directly from the third message and in the second case Site A computes the difference from the time information in the third message.

Regardless of how Site A obtains the approximation to the transit time of the second message, this approximation functions as an indication of the performance of the computer network with respect to the path from Site A to Site B.

In some embodiments, Site A also determines the actual round trip time through the computer network, based on the time at which the first (and second) messages were sent and the time at which the third message was received. This time is t5-t1.

From the actual round trip time, Site A determines the transit time of the third message from Site B to Site A. The actual transit time of the third message is t5-t4. An approximation of this transit time is (t5-t1)-(t3-t2). This approximation differs from the actual transit time for two reasons. The first is the small transit time t2-t1 and the second is a small amount of processing time between t4 and t3 on Site B. This processing time can be minimized but the t2-t1 transit time still remains. However, compared to the actual transit time of the third message, the transit time t2-t1 is small and can be neglected in practice.

The result of these determinations is a measure of the performance of the computer network (e.g., the Internet) between the routers connecting the two Sites. The transit time of the second digital message gives a measure of the performance of the computer network in the direction from Site A to Site B and the transit time of the third digital message gives a measure of performance of the computer network in the direction from Site B to Site A.

Although, as stated, specific processors, operating systems, and software supporting the invention are not required, an implementation based on Microsoft Windows NT/98 with a JAVA control program managing the system is preferred because of the potential complexity of the system. This preferred implementation allows the designer to take advantage of the built-in network support in JAVA (such as sockets, URLs, etc.) and of the availability of a JAVA ISDN API for the ISDN*tek hardware. The software architecture is shown in FIG. 5.

Figure 4:
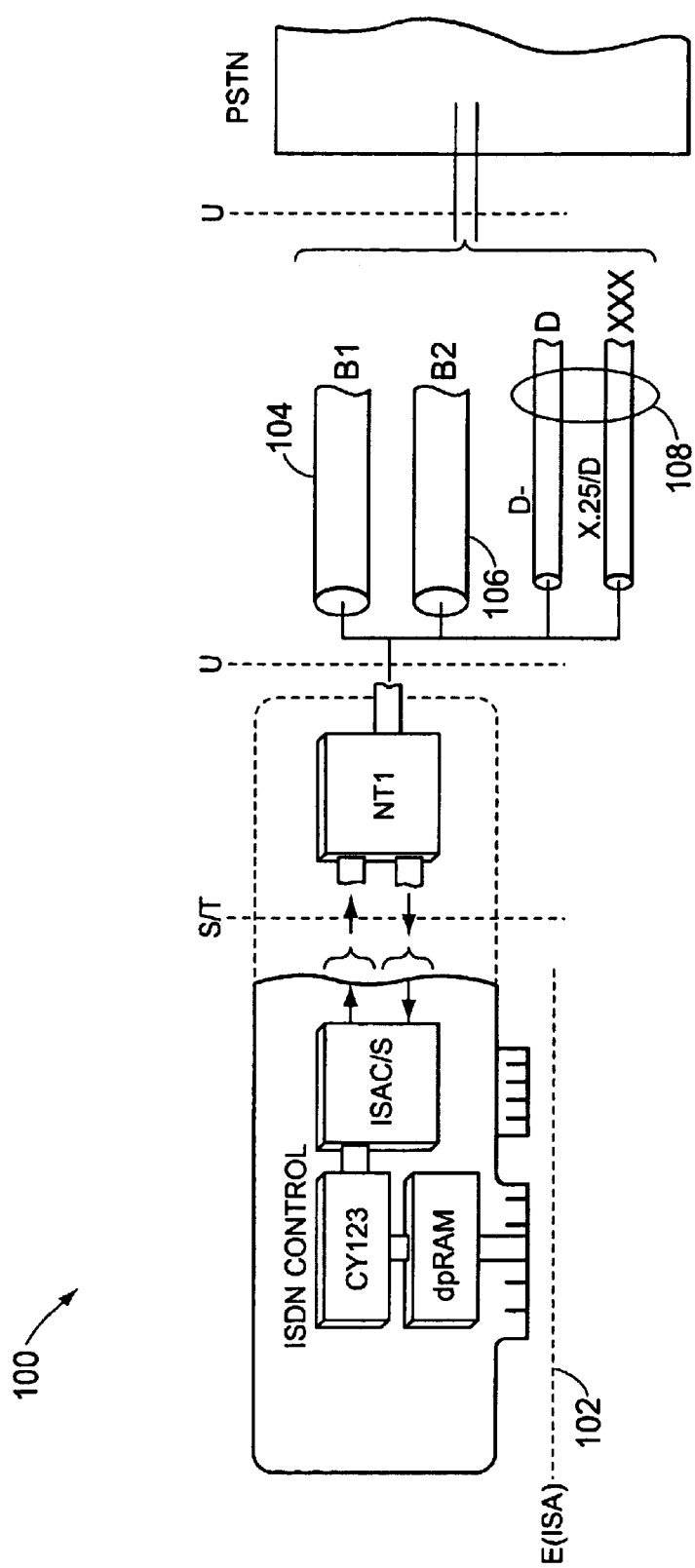
Figure 5:
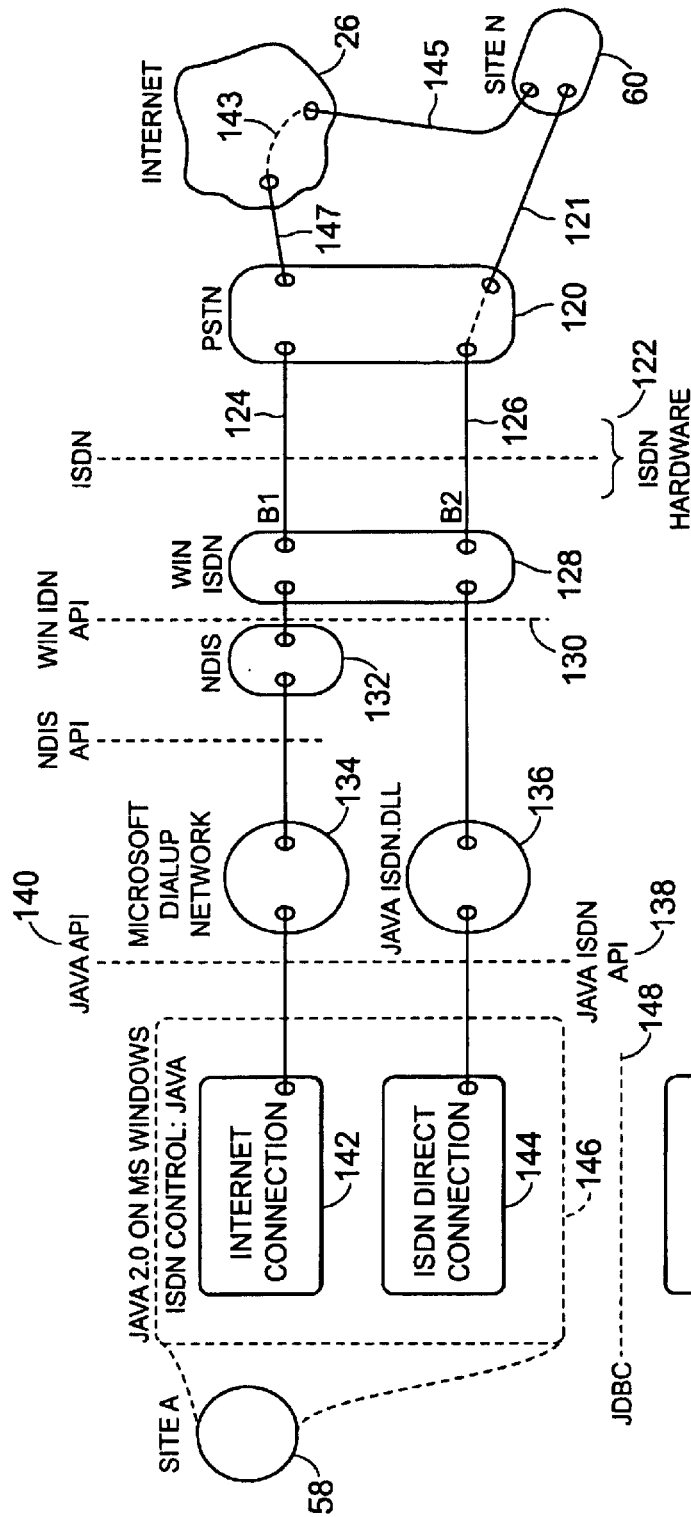

The software architecture shown in FIG. 5 connects site A 58 to another arbitrary site N 60. All of the software shown to the left of the PSTN 120 executes on a computer system located at site A 58. The ISDN hardware of FIG. 4 is represented by the ISDN dashed line 122 connecting to the PSTN via two B-channels 124 and 126.

The software driver that directly controls the hardware is WinISDN 128, which has a WinISDN API 130. WinISDN 128 supports an international open standard Application Programming Interface developed by ISDN*tek (San Gregorio), NetManage, Inc. (Cupertino, Calif.), and PSI (Performance Systems Inc., (Hearndon, Va.), and used by over twenty ISDN companies world wide.

The NDIS-to-WinISDN module translates Microsoft's NDIS (Network Driver Interface Specification) 132 to WinISDN 128, to allow the Microsoft "DIALUP NETWORKing" software 134 to dial and connect to the Internet 26. The JAVAISDN.DLL 136 is provided by ISDN*tek to allow JAVA language application programs to control ISDN hardware via the JAVA ISDN API 138. The JAVA Networking API 140 allows JAVA applications to manage the network interface via NDIS and Microsoft DIALUP NETWORKing.

The Internet Connection Subsystem 142 manages connections 143, 145 and 147 between site A 58 and site N 60 across the Internet 26. The ISDN Direct Connection Subsystem 144 manages the direct ISDN connection 120 between site A 58 and site N 60. The Internet connection and the Direct connection are represented by the respective links 143, 145, 147 and 120, 121 and it is the comparison of these links and link traversal times that forms the basis of the performance measurements. An overall Monitor program 146 manages both Internet Connection Subsystem 142 and the ISDN Direct Connection Subsystem 144 and also manages optional JDBC (Java DataBase Connectivity) 148 to an SQL2 database 150.

It should be noted that similar software runs on the computer at site N, where "N" is any of the nodes of interest in the corporate (or other private) network. As described above, in the symmetrical implementation, all sites execute the same software. In the preferred centralized implementation, the software at the main site offers the network administrator a powerful control panel, while the remote sites execute a more automated program with little or no operator interface required.

In all implementations, the typical site N opens a JAVA "Server Socket" and listens at a specific port. The server implements the accept ( ) method which blocks until a connection is received. A typical JAVA program that implements such a server is given below (omitting exception handling details):

```
pubiic class SLAM_server
{
    pubiic static void main (string args[ ])
    {
        ServerSocket SLAM_server;
            SLAM_server = new ServerSocket (SLAM_port) ;//=site
            specific
            while (true)
            {
            Socket Site_N;
            Site_N = SLAM_server.accept( ) ; // wait for connection
            process_SLAM_server(site_N); // process the connection
            Site_N.close( ) ;
            }
    }
}
```

When an incoming packet requests a connection on port 'Site_N', the software accepts the connection and processes it. Since the port is assumed SLAM specific, the process_SLAM_server( ) method must communicate with the JAVA ISDN.DLL 136 to manage the ISDN connection 125. Typically, the JAVA ISDN software has been listening for an ISDN connection (possibly qualified by calltype, caller_ID, etc.) and generates in incoming call or Connect event when the call is accepted. At this point, both the Internet link and the ISDN link are established, active and can be used to measure performance.

Because a SLAM_server serves a SLAM_client, a SLAM_client needs to connect to a SLAM_server and create input and output streams to establish communications with the SLAM_server. These input and output streams become network traffic across the Internet. Below is a JAVA program for a representative SLAM_client object.

```
input java.io.* //use the entire library
input java.net.* //use the entire library
public class SLLAM_client
{
    Socket SLAM;
    DataInputStream in;
    DataOutputStream out;
    public SLAM_client( String SLAM_server, int SLAM_port)
        throws IO exception;
    {
        //create a socket connected to the SLAM_server;
        SLAM = new socket (SLAM_server, SLAM_port)
        //streams attached to SLAM server socket:
        in = newDataInputStream( SLAM.getInputstream( ) ) ;
        out = new DataOutputStream( SLAM.getOutputStream( ) ) ;
    }
}
```

When the SLAM_client, Site A, connects to the SLAM_server, Site N, at the SLAM_port, the Monitor has established an Internet connection between Site A and Site N. Although the SLAM_client class is shown with a TCP-based (Transport Control Protocol) stream I/O, the use of UDP (User Datagram Protocol) for monitoring purposes may be preferred for some statistical measurement purposes.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of measuring the performance of a computer network, the method comprising the steps of:
    establishing a public switched telephone network (PSTN) connection between a first computer system and a second computer system;
    establishing a network connection between the first computer system and a second computer system, the network connection including the computer network;
    transmitting a first digital message from the first computer system to the second computer system over the PSTN connection;
    at the same or nearly the same time as transmitting the first digital message, transmitting a second digital message from the first computer system to the second computer system over the network connection;
    receiving a third digital message from the second site over one of the network connection and PSTN connection in response to the second digital message, the third digital message containing timing information regarding the receipt of the first and second digital messages at the second computer system; and
    deriving from the third message a one-way transit time between the first and second computer systems as an indication of the performance of the computer network.

2. A method of measuring the performance of a computer network as recited in claim 1, wherein the computer network is the Internet.

3. A method of measuring the performance of a computer network as recited in claim 1, wherein the timing information contained in the third digital message is the difference in time between the receipt of the first and second messages at the second computer system, the time difference being an indication of an approximate one-way transit time of the second message through the computer network from the first computer system to the second computer system, the one-way transit time of the second message being an indication of the performance of the computer network.

4. A method of measuring the performance of a computer network as recited in claim 3,
    wherein the first computer system determines a round trip time between the receipt of the third message and the transmission of the first message and
    wherein the step of deriving an indication of the performance of the computer network includes the step of taking a difference between the round trip time and the approximate transit time of the second message from the first computer system to the second computer system, the difference giving an approximate one-way transit time of the third message through the computer network from the second computer system to the first computer system, the one-way transit time of the third message being an indication of the performance of the computer network.

5. A method of measuring the performance of a computer network as recited in claim 1, wherein the timing information contained in the third message is a first time at which the first digital message is received at the second computer system and a second time at which the second digital message is received at the second computer system.

6. A method of measuring the performance of a computer network as recited in claim 5, wherein the step of deriving an indication of the performance of the computer network includes the step of determining the difference in time between the first and second times, the difference in times being an indication of the approximate transit time of the second message through the computer network from the first computer system to the second computer system.

7. A method of measuring the performance of a computer network as recited in claim 6,
    wherein the first computer system determines the round trip time between the receipt of the third message and the transmission of the first message; and wherein the step of deriving an indication of the performance of the computer network further includes the step of taking a difference between the round trip time and the approximate transit time of the second message from the first computer system to the second computer system, the difference giving an approximate transit time of the third message through the computer network from the second computer system to the first computer system, the transit time of the third message being an indication of the performance of the computer network.

8. A method of measuring the performance of a computer network as recited in claim 1, wherein the step of establishing a network connection between the first computer system and a second computer system includes connecting the first computer system to the computer network over the PSTN.

9. A method of measuring the performance of a computer network as recited in claim 8, wherein the PSTN connection is an ISDN connection.

10. A method of measuring the performance of a computer network as recited in claim 1, wherein the step of establishing a network connection between the first computer system and a second computer system includes connecting the first computer system to the computer network over a direct connection that bypasses the PSTN.

11. A method of measuring the performance of a computer network as recited in claim 1, wherein the step of establishing a network connection between the first computer system and a second computer system includes connecting the second computer system to the computer network over the PSTN.

12. A method of measuring the performance of a computer network as recited in claim 11, wherein the PSTN connection is an ISDN connection.

13. A method of measuring the performance of a computer network as recited in claim 1, wherein the step of establishing a network connection between the first computer system and a second computer system includes connecting the second computer system to the computer network over a direct connection that bypasses the PSTN.

14. A method of measuring the performance of a computer network as recited in claim 1, wherein the PSTN connection between the first site and the second site is a circuit-switched connection.

15. A method of measuring the performance of a computer network as recited in claim 14, wherein the circuit-switched connection is a bi-directional, synchronized communication path.

16. A method of measuring the performance of a computer network as recited in claim 14, wherein the circuit-switched connection is an all-digital connection.

17. A method of measuring the performance of a computer network as recited in claim 16, wherein the all-digital connection is an ISDN connection.

18. A method of measuring the performance of a computer network as recited in claim 14, wherein the circuit-switched connection is an analog connection.

19. A method of measuring the performance of a computer network, the method comprising the steps of:
  establishing a public switched telephone network (PSTN) connection between the first and second computer systems;
  establishing a network connection between a first and second computer systems, the network connection including the computer network;
  transmitting a first packet of information from the first computer system to the second computer system over the PSTN connection;
  transmitting a second packet of information, at the same or nearly the same time as transmitting the first packet, from the first computer to the second computer system over the network connection;
  receiving a third packet of information over one of the computer network and the PSTN from the second computer system in response to the second system receiving the second packet of information, the third packet containing timing information regarding the receipt of the first and second packets at the second computer system; and
  deriving from the third packet a one-way transit time between the first and second computer systems as an indication of the performance of the computer network.

20. A system for measuring performance of a computer network, the system comprising:
  a first program operating on a first computer system connected through the computer network to a second computer system and connected through the public switched telephone network (PSTN) to the second computer system, the first program operating to transmit, at the same or nearly the same time, a first digital message over the PSTN to the second computer system, and a second digital message over the computer network to the second computer system; and
  a second program operating on a second computer system to send a third digital message over one of the computer network and the PSTN to the first computer system in response to the second digital message, the third message containing timing information regarding the receipt of the first and second packets at the second computer system;
  wherein the first program operates to derive from the third packet a one-way transit time between the first and second computer systems as an indication of the performance of the computer network.

21. A system for measuring performance of a computer network as recited in claim 20, wherein the computer network is the Internet.

22. A system for measuring performance of a computer network as recited in claim 20, wherein the timing information contained in the third message is the difference in time between the receipt of the first and second messages at the second computer system, the time difference being an indication of an approximate one-way transit time of the second message through the computer network from the first computer system to the second computer system, the transit time of the second message being an indication of the performance of the computer network.

23. A system for measuring performance of a computer network as recited in claim 22,
  wherein the first program determines a round trip time between the receipt of the third message and the transmission of the first message; and
  wherein the first program finds the difference between the round trip time and the approximate one-way transit time of the second message from the first computer system to the second computer system, the difference giving an approximate one-way transit time of the third message through the computer network from the second computer system to the first computer system, the transit time of the third message being an indication of the performance of the computer network.

24. A system for measuring performance of a computer network as recited in claim 20, wherein the timing information contained in the third message is a first time at which the first digital message is received and a second time at which the second digital message is received at the second computer system.

25. A system for measuring performance of a computer network as recited in claim 24, wherein the first program determines the difference in time between the first and second times, the difference in times being an indication of the approximate one-way transit time of the second message through the computer network from the first computer system to the second computer system.

26. A system for measuring performance of a computer network as recited in claim 25,
   wherein the first computer system determines the round trip time between the receipt of the third message and the transmission of the first message; and
   wherein the first program finds the difference between the round trip time and the approximate one-way transit time of the second message from the first computer system to the second computer system, the difference giving an approximate one-way transit time of the third message through the computer network from the second computer system to the first computer system, the one-way transit time of the third message being an indication of the performance of the computer network.

27. A system for measuring performance of a computer network as recited in claim 20, wherein the first computer system is connected to the computer network over the PSTN.

28. A system for measuring performance of a computer network as recited in claim 27, wherein the PSTN connection is an ISDN connection.

29. A system for measuring performance of a computer network as recited in claim 20, wherein the first computer system is connected to the computer network over a direct connection that bypasses the PSTN.

30. A system for measuring performance of a computer network as recited in claim 29, wherein the direct connection is a cable system connection.

31. A system for measuring performance of a computer network as recited in claim 29, wherein the direct connection is an ADSL connection.

32. A system for measuring performance of a computer network as recited in claim 20, wherein the second computer system is connected to the computer network over the PSTN.

33. A system for measuring performance of a computer network as recited in claim 32, wherein the PSTN connection is an ISDN connection.

34. A system for measuring performance of a computer network as recited in claim 20, wherein the second computer system is connected to the computer network over a direct connection that bypasses the PSTN.

35. A system for measuring performance of a computer network as recited in claim 34, wherein the direct connection is a cable system connection.

36. A system for measuring performance of a computer network as recited in claim 34, wherein the direct connection is an ADSL connection.

37. A system for measuring performance of a computer network as recited in claim 20, wherein the PSTN connection between the first site and the second site is a circuit-switched connection.

38. A system for measuring performance of a computer network as recited in claim 37, wherein the circuit-switched connection is a bi-directional, synchronized communication path.

39. A system for measuring performance of a computer network as recited in claim 37, wherein the circuit-switched connection is an all-digital connection.

40. A system for measuring performance of a computer network as recited in claim 39, wherein the all-digital connection is an ISDN connection.

41. A system for measuring performance of a computer network as recited in claim 37, wherein the circuit-switched connection is an analog connection.

42. A system for measuring performance of a computer network as recited in claim 20, wherein the first program utilizes a Java language Networking Application Programming Interface (NAPI) to manage the transfer of digital messages sent over the computer network.

43. A system for measuring performance of a computer network as recited in claim 42,
   wherein a Java ISDN Application Programming Interface (API) is used to manage the transfer of digital messages sent over the PSTN; and
   wherein the results of the Java NAPI transfers and the Java ISDN API transfers between the first and second computer systems are used to derive a measure of the computer network performance.

44. A system for measuring performance of a computer network as recited in claim 20, wherein a Java ISDN Application Programming Interface is used to manage the transfer of digital messages sent over the PSTN.

45. A system for measuring performance of a computer network as recited in claim 20, wherein the first and second programs are the same.

46. A system for measuring performance of a computer network as recited in claim 20, wherein only the first program operates to determining the performance of the computer network.

47. A system for measuring performance of a computer network as recited in claim 20, wherein the PSTN connection between the first and second computer systems uses X.25 protocol to coordinate and synchronize performance monitoring between the two computer systems.

48. A system for measuring performance of a computer network as recited in claim 20, further comprising an administrative program operating on either the first or second computer system to control performance monitoring of the computer network by the first and second programs.

49. A system for measuring performance of a computer network as recited in claim 48, wherein the administrative program operates to be remotely accessed by another computer system connected to computer network to schedule performance monitoring by the first and second programs.

50. A system for measuring performance of a computer network as recited in claim 20, wherein the first program includes an JDBC API for accessing an SQL database to manage and report performance monitoring results.

51. A system for measuring performance of a computer network as recited in claim 50, wherein the SQL database is accessible to receive queries by authorized administrative agents.

52. A system for measuring performance of a computer network, the system comprising:
   a first program operating on a first computer system connected through the computer network to a second and a third computer system and connected through the public switched telephone network (PSTN) to the second computer and third computer systems, the first program operating to transmit, at the same or nearly the same time, a first digital message over the PSTN and a second digital message over the computer network to the second computer system, and the first program operating to transmit, at the same or nearly the same time, a third digital message over the PSTN and a fourth digital message over the computer network to the third computer system; and a second program operating on the second and third computer systems to transmit fifth and sixth digital messages over one of the computer network and the PSTN to the first computer system in response to the second and fourth digital messages, respectively, the fifth message containing timing information regarding the receipt of the first and second messages at the second computer system, and the sixth message containing information regarding the receipt of the third and fourth messages at the third computer system;

wherein the first program operates to derive from the fifth message a one-way transit time between the first and second computer systems as and sixth message a one-way transit time between the first and third computer systems as an indication of the performance of the computer network.

53. A method of measuring performance of a computer network, the method comprising:

establishing a network and a PSTN connection between a main computer system and one or more other computer systems connected to the network and the PSTN;

transmitting a pair of messages at the same or nearly the same time to each of the other computer systems, one of the pair traveling over the PSTN, and the other of the pair traveling over the computer network;

receiving responses from each of the other computer systems to the transmitted messages, each of the responses containing timing information regarding the receipt of the pair of messages at each of the other computer systems; and determining a one way transit time as an indication of the performance of the computer network from the responses.

54. A method of measuring performance of a computer network, the method comprising:

establishing a network connection between a first computer system and a second computer system, each system being connected to the computer network;

establishing a high-speed connection between the first and second computer systems, the high-speed connection being separate from the network connection;

transmitting a pair of messages at the same or nearly the same time from the first to the second computer system, one of the pair traveling over the high-speed connection and the other of the pair traveling over the network connection;

receiving a response message from the second computer system to the message sent over the network connection, the response containing timing information regarding the receipt of the pair of messages at the second computer system; and determining a one way transit time as an indication of the performance of the computer network from the response.

55. A method of measuring performance of a computer network as recited in claim 54, wherein the high-speed connection is a circuit-switched connection.

\* \* \* \* \*